United States Patent
Nakao et al.

(10) Patent No.: US 10,944,293 B2
(45) Date of Patent: Mar. 9, 2021

(54) NONCONTACT POWER SUPPLY APPARATUS

(71) Applicant: Omron Corporation, Kyoto (JP)

(72) Inventors: Goro Nakao, Inazawa (JP); Toshiyuki Zaitsu, Kizugawa (JP)

(73) Assignee: Omron Corporation, Kyoto (JP)

( * ) Notice: Subject to any disclaimer, the term of this patent is extended or adjusted under 35 U.S.C. 154(b) by 0 days.

(21) Appl. No.: 16/468,179

(22) PCT Filed: Nov. 24, 2017

(86) PCT No.: PCT/JP2017/042284
§ 371 (c)(1),
(2) Date: Jun. 10, 2019

(87) PCT Pub. No.: WO2018/159031
PCT Pub. Date: Sep. 7, 2018

(65) Prior Publication Data
US 2020/0014244 A1 Jan. 9, 2020

(30) Foreign Application Priority Data
Mar. 2, 2017 (JP) .............................. JP2017-039682

(51) Int. Cl.
*H01F 38/00* (2006.01)
*H02J 50/12* (2016.01)

(52) U.S. Cl.
CPC .................................... *H02J 50/12* (2016.02)

(58) Field of Classification Search
CPC ...................................................... H02J 50/12
USPC ........................................................ 307/104
See application file for complete search history.

(56) References Cited

U.S. PATENT DOCUMENTS

2017/0256993 A1   9/2017   Nakamura et al.

FOREIGN PATENT DOCUMENTS

| JP | 2001-160122 A | 6/2001 |
| JP | 2006-74848 A  | 3/2006 |
| JP | 2015-12761 A  | 1/2015 |

(Continued)

OTHER PUBLICATIONS

International Search Report issued in Application No. PCT/JP2017/042284, dated Jan. 9, 2018 (2 pages).

(Continued)

*Primary Examiner* — Rexford N Barnie
*Assistant Examiner* — Dru Parries
(74) *Attorney, Agent, or Firm* — Osha Bergman Watanabe & Burton LLP (57) ABSTRACT

A power transmission device of this noncontact power supply apparatus has a transmission coil for supplying power to a power reception device, and a power supply circuit that supplies AC power to the transmission coil. A power reception device of the noncontact power supply apparatus has a reception coil for receiving power from the power transmission device, a variable capacity circuit that is connected to the reception coil in parallel and that can adjust capacitance, a resonance circuit that resonates with a frequency corresponding to the inductance of the reception coil and the capacitance of the variable capacity circuit, a voltage detection circuit that detects an output voltage from the resonance circuit, and a control circuit that controls the capacitance of the variable capacity circuit according to the output voltage.

2 Claims, 7 Drawing Sheets

(56) References Cited

FOREIGN PATENT DOCUMENTS

JP          2016-146689 A       8/2016
WO          2012/081424 A1      6/2012

OTHER PUBLICATIONS

Written Opinion issued in International Application No. PCT/JP2017/042284 (5 pages).
International Preliminary Report on Patentability issued in Application No. PCT/JP2017/042284, dated Jul. 25, 2018 (3 pages).
Tohi et al.; "Maximum Efficiency of Contactless Power Transfer System using k and Q;" The Institute of Electrical Engineers of Japan Technical Meeting Document; SPC, Semiconductor Power Converter Technical Meeting; 2011 (6 pages).
Fujita et al.; "Contactless Power Transfer Systems using Series and Parallel Resonant Capacitors;" IEEJ Transactions D (IEEJ Transactions on Industry Applications), 2007, 127 (2), pp. 174-180 (6 pages).
Office Action issued in Korean Application No. 10-2019-7015687,14, dated Jul. 2020 (8 pages).

FROM CONTROL CIRCUIT

FIG. 7B

FROM CONTROL CIRCUIT

FIG. 7C

FROM CONTROL CIRCUIT

NONCONTACT POWER SUPPLY APPARATUS

FIELD

The present invention relates to a noncontact power supply apparatus.

BACKGROUND

Conventionally, techniques for transmitting electric power through space without using metal contacts or the like, or so-called noncontact power supply (also called wireless power supply) have been studied.

As one of noncontact power supply techniques, a method of supplying power by electromagnetic induction is known. In a method of supplying power by electromagnetic induction, a series-primary parallel-secondary (power reception side) capacitors method (hereinafter referred to as the SP method) is used (see, for example, NPL 1). According to the SP method, a capacitor is connected in series with a transmission coil serving as a part of a transformer on the primary side (power transmission side) and a capacitor is connected in parallel with a reception coil serving as another part of the transformer on the secondary side (power reception side).

In the SP method, the resonance circuit that includes the reception coil and the capacitor on the power reception side causes parallel resonance and the output from the resonance circuit is a constant current output. Thus, it is generally more difficult to perform control in the SP method, compared with the series-primary series-secondary capacitors method (hereinafter referred to as the SS method. See, for example, PTL 1), in which the output on the power reception side is a constant voltage output. This is because electric appliances are generally controlled by a constant voltage. Further, in the power transfer using series resonance on the power transmission side, the resonance current on the power transmission side increases during the power supply and energy transmission efficiency declines when the coupling coefficient between the transmission coil on the power transmission side and the reception coil on the power reception side is very low (for example, coupling coefficient k<0.2). Therefore, it is preferable not to use series resonance on the power transmission side for the power transfer in a use in which the coupling coefficient cannot be kept high. Further, when series resonance on the power transmission side is not used, it is possible to transmit greater power by using parallel resonance on the power reception side. Therefore, a noncontact power supply apparatus preferably has a circuit configuration in which the resonance circuit on the power reception side chiefly performs power transfer when the coupling coefficient is very low. In other words, it is possible to increase power transfer efficiency with a circuit configuration adopting the SP method rather than the SS method.

On the other hand, a technique has been proposed for outputting a constant voltage on the power reception side in the SP method by selecting appropriate capacitance values for the capacitors in the resonance circuits on the power transmission side and the power reception side (see, for example, NPL 2).

CITATION LIST

Patent Literature

[PTL 1] Japanese Unexamined Patent Publication (Kokai) No. 2016-146689.

Non Patent Literature

[NPL 1] Tohi et al., "Maximum Efficiency of Contactless Power Transfer System using k and Q", The Institute of Electrical Engineers of Japan Technical Meeting Document, SPC, Semiconductor Power Converter Technical Meeting, 2011.

[NPL 2] Fujita et al., "Contactless Power Transfer Systems using Series and Parallel Resonant Capacitors", IEEJ Transactions D (IEEJ Transactions on Industry Applications), 2007, 127 (2), pp 174-180.

SUMMARY

Technical Problem

However, even by the technique disclosed in NPL 2, the capacitance of the capacitor of the resonance circuit for a constant output voltage depends on the coupling coefficient; therefore it is difficult to apply this technique when the noncontact power supply apparatus is used in an environment where the coupling coefficient dynamically changes. On the other hand, by the technique disclosed in PTL 1, the frequency of the AC power supplied to the power transmission coil is altered in accordance with the change in the coupling coefficient to cope with changes in the coupling coefficient to a certain degree but, since the technique disclosed in PTL 1 is based on the SS method, the power transfer efficiency declines when the coupling coefficient is very low as described above.

To address this, an objective of the present invention is to provide a noncontact power supply apparatus that suppresses a decline in energy transmission efficiency even when the coupling coefficient between the transmission coil and the reception coil dynamically changes.

Solution to Problem

As an embodiment of the present invention, there is provided a noncontact power supply apparatus including a power transmission device and a power reception device to which electric power is transmitted from the power transmission device without contact. In this noncontact power supply apparatus, the power transmission device includes a transmission coil that supplies electric power to the power reception device and a power supply circuit that supplies AC power to the transmission coil, whereas the power reception device includes a resonance circuit that includes a reception coil that receives electric power from the power transmission device and a variable capacity circuit with an adjustable capacitance connected in parallel with the reception coil, the resonance circuit resonating at a frequency in accordance with an inductance of the reception coil and a capacitance of the variable capacity circuit, a voltage detection circuit that detects an output voltage from the resonance circuit, and a control circuit that controls the capacitance of the variable capacity circuit in accordance with the output voltage.

In this noncontact power supply apparatus, it is preferable that the control circuit decreases the capacitance of the variable capacity circuit as the output voltage from the resonance circuit increases.

Further, in this noncontact power supply apparatus, it is preferable that the variable capacity circuit includes a plurality of coils, that at least one switching element connected with one of the plurality of coils and the plurality of coils are respectively connected with the reception coil in parallel, and that the control circuit switches on and off the at least one switching element in accordance with the output voltage from the resonance circuit.

Advantageous Effects of Invention

A noncontact power supply apparatus according to the present invention has an advantageous effect of suppressing a decline in energy transmission efficiency even when the coupling coefficient between the transmission coil and the reception coil dynamically changes.

DESCRIPTION OF EMBODIMENTS

A noncontact power supply apparatus according to an embodiment of the present invention will be described below with reference to the drawings. This noncontact power supply apparatus supplies power from a power transmission device that does not include a resonance circuit and directly supplies AC power to a transmission coil to a power reception device that includes a resonance circuit that causes parallel resonance. The inventors noted that, in an SP method, when the resonance frequency of the resonance circuit of the power transmission device is brought closer to the resonance frequency of the resonance circuit of the power reception device, the maximum power that can be supplied increases but the energy transmission efficiency does not necessarily improve because the current passing the transmission coil included in the resonance circuit of the power transmission device also increases especially when the coupling coefficient is low.

Figure 1A:
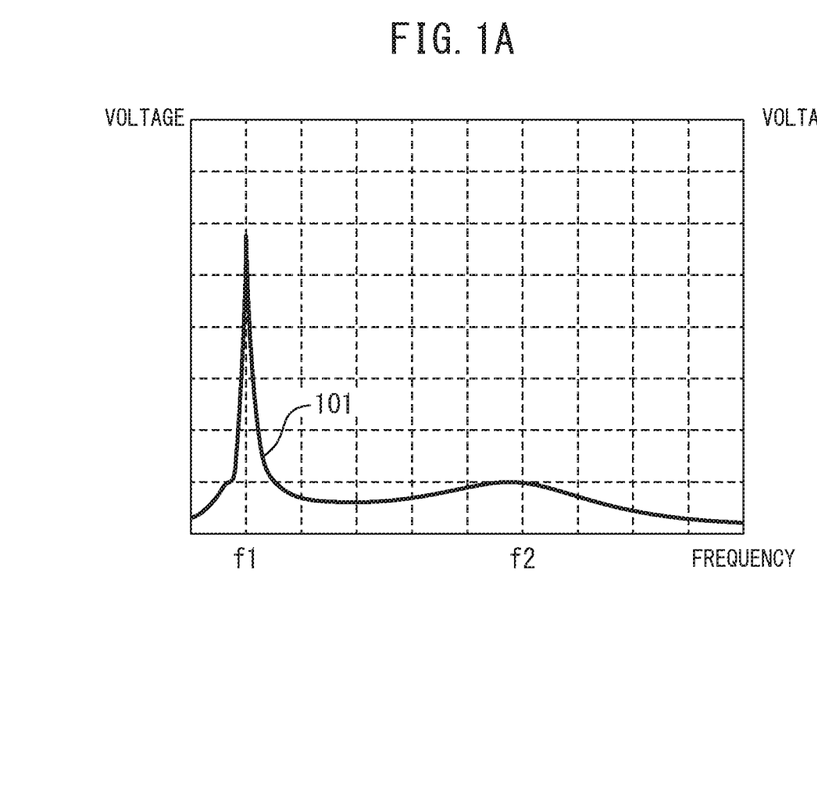
FIG. 1A illustrates an example of frequency characteristics of an output voltage of a resonance circuit on a power reception side in an SP method in a case in which a resonance frequency of the resonance circuit on the power reception side is greater than the resonance frequency of the resonance circuit on a power transmission side.
Figure 1B:
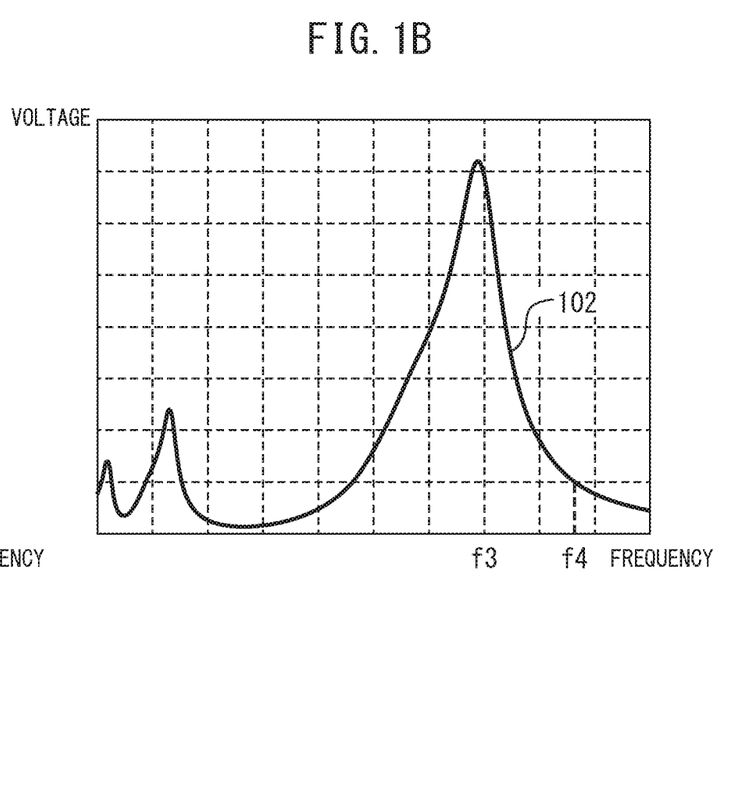
FIG. 1B illustrates an example of frequency characteristics of the output voltage of the resonance circuit on the power reception side in the SP method in a case in which the resonance frequency of the resonance circuit on the power transmission side is approximately equal to the resonance frequency of the resonance circuit on the power reception side.

FIG. 1A illustrates an example of frequency characteristics of an output voltage of the resonance circuit on the power reception side in the SP method in a case in which the resonance frequency of the resonance circuit on the power reception side is greater than the resonance frequency of the resonance circuit on the power transmission side. Further, FIG. 1B illustrates an example of frequency characteristics of the output voltage of the resonance circuit on the power reception side in the SP method in a case in which the resonance frequency of the resonance circuit on the power transmission side is approximately equal to the resonance frequency of the resonance circuit on the power reception side. In FIG. 1A and FIG. 1B, frequency is plotted along the horizontal axis and voltage is plotted along the vertical axis. The graph 101 illustrated in FIG. 1A represents frequency characteristics of the output voltage of the resonance circuit on the power reception side in a case in which the resonance frequency of the resonance circuit on the power reception side is greater than the resonance frequency of the resonance circuit on the power transmission side. Further, the graph 102 illustrated in FIG. 1B represents frequency characteristics of the output voltage of the resonance circuit on the power reception side in a case in which the resonance frequency of the resonance circuit on the power transmission side is approximately equal to the resonance frequency of the resonance circuit on the power reception side. As illustrated by the graph 101, when the resonance frequency of the resonance circuit on the power reception side is greater than the resonance frequency of the resonance circuit on the power transmission side, output voltage peaks are observed at the resonance frequency f1 of the resonance circuit of the power transmission side or the resonance frequency f2 of the resonance circuit on the power reception side. On the other hand, as illustrated by the graph 102, when the resonance frequency of the resonance circuit on the power transmission side is approximately equal to the resonance frequency of the resonance circuit on the power reception side, an output voltage peak is observed at the resonance frequency f3, which is common to the power transmission side and the power reception side. The peak voltage is higher than either of the voltage peaks in the case in which the resonance frequency of the resonance circuit on the power reception side is greater than the resonance frequency of the resonance circuit on the power transmission side.

Figure 2A:
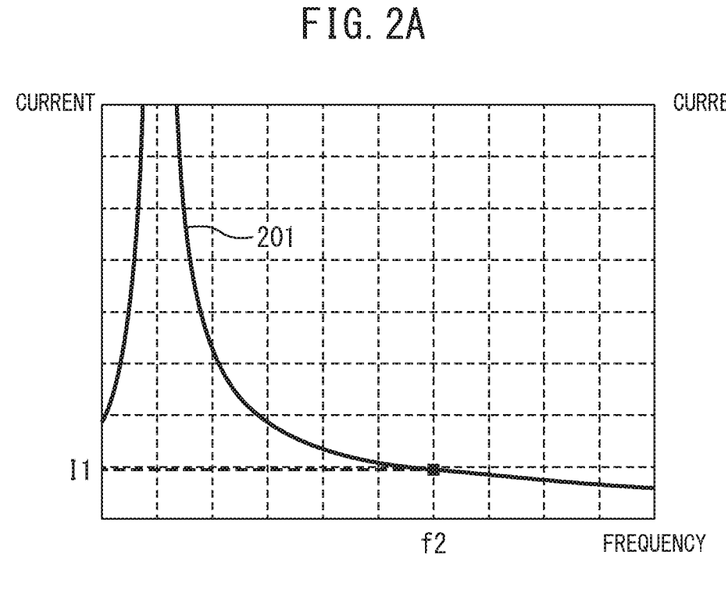
FIG. 2A illustrates frequency characteristics of the current passing through a transmission coil when the resonance circuits on the power transmission side and the power reception side are identical to the resonance circuits in FIG. 1A.
Figure 2B:
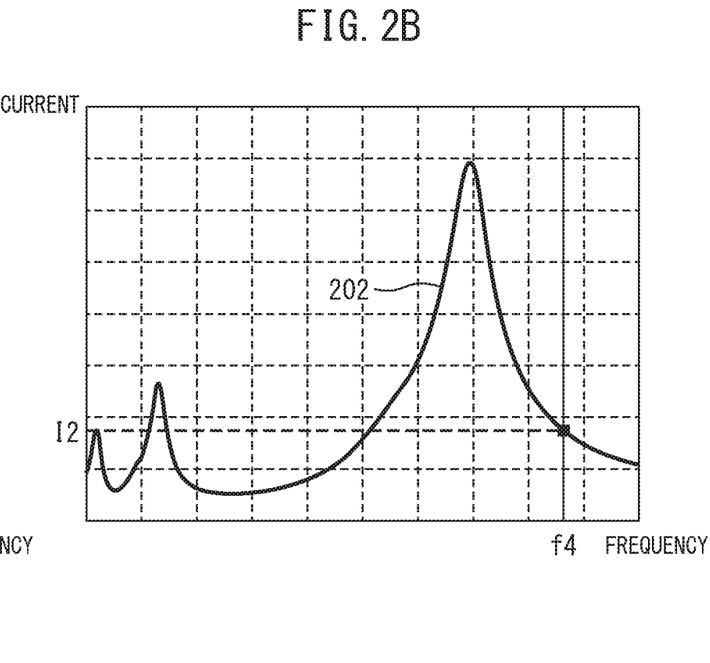
FIG. 2B illustrates frequency characteristics of the current passing through the transmission coil when the resonance circuits on the power transmission side and the power reception side are identical to the resonance circuits in FIG. 1B.

FIG. 2A illustrates frequency characteristics of the current passing through the transmission coil of the resonance circuit on the power transmission side when the resonance circuits on the power transmission side and the power reception side are identical to the resonance circuits in FIG. 1A. Further, FIG. 2B illustrates frequency characteristics of the current passing through the transmission coil of the resonance circuit on the power transmission side when the resonance circuits on the power transmission side and the power reception side are identical to the resonance circuits in FIG. 1B. In FIG. 2A and FIG. 2B, frequency is plotted along the horizontal axis and current is plotted along the vertical axis. The graph 201 illustrated in FIG. 2A represents the frequency characteristics of the current passing through the transmission coil that corresponds to the frequency characteristics of the output voltage of the resonance circuit on the power reception side illustrated in FIG. 1A. The graph 202 illustrated in FIG. 2B represents the frequency characteristics of the current passing through the transmission coil that corresponds to the frequency characteristics of the output voltage of the resonance circuit on the power reception side illustrated in FIG. 1B. As illustrated in the graph 201 and the graph 202, even when the output voltage of the resonance circuit on the power reception side is the same, a greater current passes through the transmission coil when the resonance frequency of the resonance circuit on the power transmission side is approximately equal to the resonance frequency of the resonance circuit on the power reception side. For example, as illustrated by the graph 101 and the graph 102, the output voltage at the resonance frequency f2 on the power reception side in the case in which the resonance frequency of the resonance circuit on the power reception side is greater than the resonance frequency of the resonance circuit on the power transmission side is approximately equal to the output voltage at the frequency f4 in the case in which the resonance frequency of the resonance circuit on the power transmission side is approximately equal to the resonance frequency of the resonance circuit on the power reception side. In contrast, as illustrated by the graph 201 and the graph 202, the current value I2 passing through the transmission coil at the frequency f4 in the case in which the resonance frequency of the resonance circuit on the power transmission side is approximately equal to the resonance frequency of the resonance circuit on the power reception side is greater than the current value I1 that passes through the transmission coil at the resonance frequency f2 in the case in which the resonance frequency of the resonance circuit on the power reception side is greater than the resonance frequency of the resonance circuit on the power transmission side. It can be seen from this that a higher energy transmission efficiency is achieved by making the difference greater between the resonance frequency of the resonance circuit on the power transmission side and the resonance frequency of the resonance circuit on the power reception side and by using AC power having a frequency at which the resonance circuit on the power transmission side does not resonate, rather than making the resonance frequency of the resonance circuit on the power transmission side equal to the resonance frequency of the resonance circuit on the power reception side. This is because, when the resonance frequency of the resonance circuit on the power transmission side is equal to the resonance frequency of the resonance circuit on the power reception side, the lower the coupling coefficient between the transmission coil and the reception coil, the smaller the mutual inductance between the transmission coil and the reception coil, and as a result, the current passing through the transmission coil increases irrespective of the load.

Thus, this noncontact power supply apparatus does not include a resonance circuit on the power transmission side but controls the capacitance of the variable capacity circuit that is connected in parallel with the power reception coil and that constitutes, together with the power reception coil, a resonance circuit on the power reception side, in accordance with the output voltage of the resonance circuit on the power reception side, and thereby suppresses the current passing through the transmission coil and suppresses the circulating current passing through the resonance circuit. This noncontact power supply apparatus thus suppresses a decline in energy transmission efficiency even when the coupling coefficient between the transmission coil and the reception coil dynamically changes.

A noncontact power supply method will be hereinafter referred to as a second resonance method when, as disclosed herein, no resonance circuit is used on the primary (transmission) side and a resonance circuit is provided on the secondary (power reception) side, the resonance circuit having a resonance frequency in accordance with the inductance of the reception coil when the transmission coil is short-circuited and with the capacitance of a capacitive element connected in parallel with the reception coil. Note that a noncontact power supply method with a capacitive element connected in series or in parallel with the transmission coil on the primary side will also be referred to as the second resonance method when the resonance frequency in accordance with the capacitive element and the transmission coil is lower than the resonance frequency on the secondary side to such a degree that the AC power supplied to the transmission coil does not cause resonance on the primary side. Further, in the second resonance method, the resonance frequency in accordance with the inductance of the reception coil when the transmission coil is short-circuited and with the capacitance of the capacitive element connected in parallel with the reception coil will be referred to as the second resonance frequency.

Figure 3A:
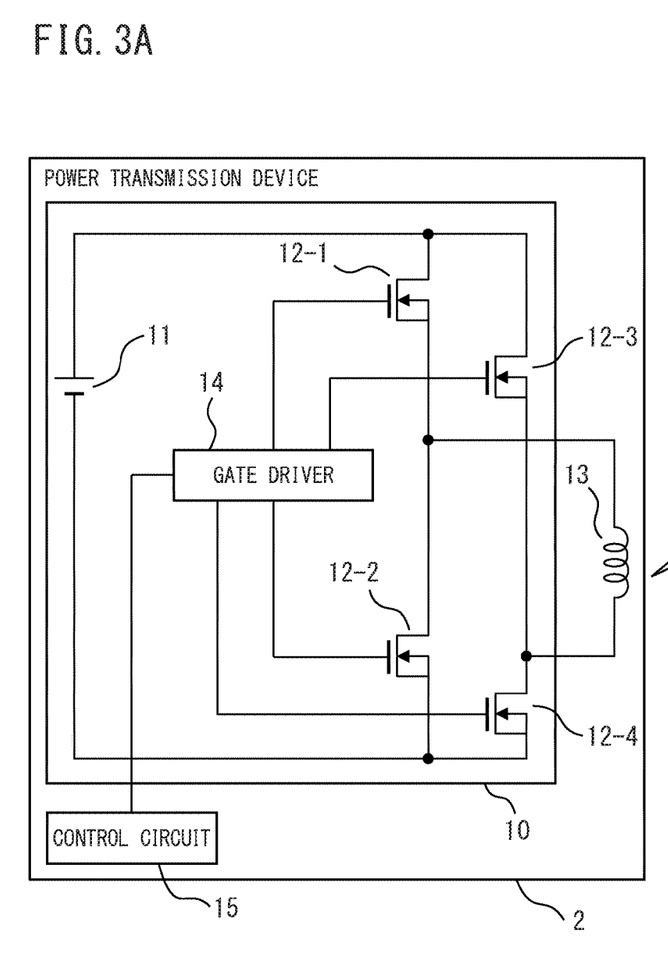
FIG. 3A is a schematic configuration view of a noncontact power supply apparatus according to an embodiment of the present invention.
Figure 3B:
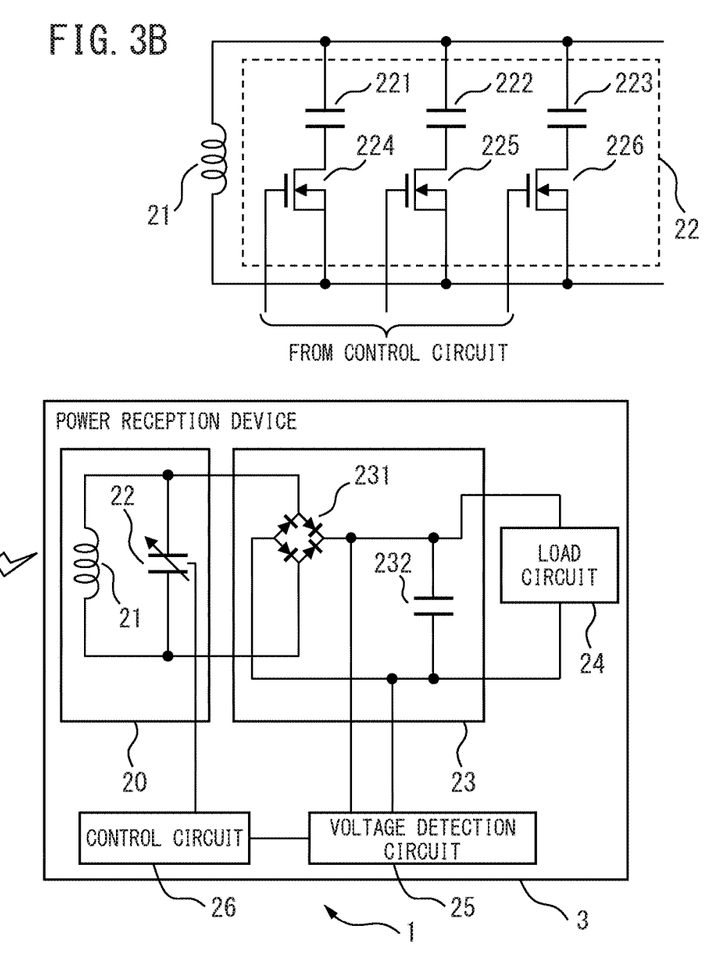
FIG. 3B is a circuit diagram of a variable capacity circuit.

FIG. 3A is a schematic configuration view of a noncontact power supply apparatus according to an embodiment of the present invention. Further, FIG. 3B is a circuit diagram of a variable capacity circuit. As illustrated in FIG. 3A, the noncontact power supply apparatus 1 includes a power transmission device 2 and a power reception device 3 to which power is supplied from the power transmission device 2 through space. The power transmission device 2. includes a power supply circuit 10, a transmission coil 13, a gate driver 14, and a control circuit 15. On the other hand, the power reception device 3 includes a resonance circuit 20 that includes a reception coil 21 and a variable capacity circuit 22, a rectification and smoothing circuit 23, a load circuit 24, a voltage detection circuit 25, and a control circuit 26.

First, the power transmission device 2 will be described. The power supply circuit 10 supplies AC power having a prescribed switching frequency to the transmission coil 13. To do so, the power supply circuit 10 includes a DC power source 11 and four switching elements 12-1 to 12-4.

The DC power source 11 supplies DC power having a prescribed voltage. To do so, the DC power source 11 may include, for example, a battery. Alternatively, the DC power source 11 may be connected with a commercial AC power source and include a full-wave rectification circuit and a smoothing capacitor to convert the AC power supplied by the AC power source to DC power.

The four switching elements 12-1 to 12-4 may be, for example, n-channel MOSFETs, Among the four switching elements 12-1 to 12-4, the switching element 12-1 and the switching element 12-2 are connected in series between the positive electrode terminal and the negative electrode terminal of the DC power source 11. In the present embodiment, the switching element 12-1 is connected on the positive electrode side of the DC power source 11, whereas the switching element 12-2 is connected on the negative electrode side of the DC power source 11. The drain terminal of the switching element 12-1 is connected with the positive electrode terminal of the DC power source 11, and the source terminal of the switching element 12-1 is connected with the drain terminal of the switching element 12-2. Further, the source terminal of the switching element 12-2 is connected with the negative electrode terminal of the DC power source 11. Furthermore, the source terminal of the switching element 12-1 and the drain terminal of the switching element 12-2 are connected with one end of the transmission coil 13, and the source terminal of the switching element 12-2 is connected with the other end of the transmission coil 13 via the switching element 12-4.

Similarly, among the four switching elements 12-1 to 12-4, the switching element 12-3 and the switching element 12-4 are connected in parallel with the switching element 12-1 and the switching element 12-2 and in series between the positive electrode terminal and the negative electrode terminal of the DC power source 11. The switching element 12-3 is connected on the positive electrode side of the DC power source 11, whereas the switching element 12-4 is connected on the negative electrode side of the DC power source 11. The drain terminal of the switching element 12-3 is connected with the positive electrode terminal of the DC power source 11, and the source terminal of the switching element 12-3 is connected with the drain terminal of the switching element 12-4. Further, the source terminal of the switching element 12-4 is connected with the negative electrode terminal of the DC power source 11. Furthermore, the source terminal of the switching element 12-3 and the drain terminal of the switching element 12-4 are connected with the other end of the transmission coil 13.

Further, the gate terminals of the switching elements 12-1 to 12-4 are connected with the control circuit 15 via the gate driver 14. Further, each of the switching elements 12-1 to 12-4 may have its gate terminal connected with its own source terminal via a resistor to ensure that the switching element turns on when a voltage to turn on the switching element is applied. The switching elements 12-1 to 12-4 switch on and off at a prescribed switching frequency in accordance with a control signal from the control circuit 15. In the present embodiment, the pair of switching element 12-1 and the switching element 12-4 and the pair of the switching element 12-2 and the switching element 12-3 are alternatingly switched on and off to turn off the switching element 12-2 and the switching element 12-3 when the switching element 12-1 and the switching element 12-4 are turned on and, conversely, to turn off the switching element 12-1 and the switching element 12-4 when the switching element 12-2 and the switching element 12-3 are turned on. Thus, the DC power supplied from the DC power source 11 is converted into AC power having the switching frequency of the switching elements and supplied to the transmission coil 13.

The transmission coil 13 transmits the AC power supplied from the power supply circuit 10 to the resonance circuit 20 of the power reception device 3 through space.

The gate driver 14 receives a control signal for switching on and off the switching elements 12-1 to 12-4 from the control circuit 15 and, in accordance with the control signal, alters the voltages applied to the gate terminals of the switching elements 12-1 to 12-4. In other words, upon receiving a control signal to switch on the switching element 12-1 and the switching element 12-4, the gate driver 14 applies to the gate terminal of the switching element 12-1 and the gate terminal of the switching element 12-4 such relatively high voltages as to turn on the switching element 12-1 and the switching element 12-4. This allows the current from the DC power source 11 to pass through the switching element 12-1, the transmission coil 13, and the switching element 12-4. On the other hand, upon receiving a control signal to switch off the switching element 12-1 and the switching element 12-4, the gate driver 14 applies to the gate terminal of the switching element 12-1 and the gate terminal of the switching element 12-4 such relatively low voltages as to turn off the switching element 12-1 and the switching element 12-4 as not to allow a current from the DC power source 11 from passing through the switching element 12-1 and the switching element 12-4. Similarly, the gate driver 14 controls the voltages applied to the gate terminals of the switching element 12-2 and the switching element 12-3. Thus, when the switching element 12-1 and the switching element 12-4 are turned off and the switching element 12-2 and the switching element 12-3 are turned on, a current from the DC power source 11 passes through the switching element 12-3, the transmission coil 13, and the switching element 12-2.

The control circuit 15 includes, for example, a non-volatile memory circuit and a volatile memory circuit, an arithmetic operation circuit, an interface circuit for the connection with other circuits. The control circuit 15 controls the switching on and off of the switching elements of the power supply circuit 10 so that the power supply circuit 10 can supply AC power to the transmission coil 13.

In the present embodiment, the control circuit 15 controls the switching elements 12-1 to 12-4 in such a way that the pair of the switching element 12-1 and the switching element 12-4 and the pair of the switching element 12-2 and the switching element 12-3 are alternatingly switched on and that the duration in which the pair of the switching element 12-1 and the switching element 12-4 is on and the duration in which the pair of the switching element 12-2 and the switching element 12-3 is on are equal in one period, the period corresponding to the switching frequency. Note that, in switching on and off the pair of the switching element 12-1 and the switching element 12-4 and the pair of the switching element 12-2 and the switching element 12-3, the control circuit 15 may set a dead time during which both of the pairs of switching elements are switched off in order to prevent a short circuit of the DC power source 11, which occurs when the pair of the switching element 12-1 and the switching element 12-4 and the pair of the switching element 12-2 and the switching element 12-3 are simultaneously on.

Next, the power reception device 3 will be described.

The resonance circuit 20 is an LC resonance circuit that includes a reception coil 21 and a variable capacity circuit 22 connected in parallel with each other. One end of the reception coil 21 included in the resonance circuit 20 is connected with one end of the variable capacity circuit 22 and with one input terminal of a rectification and smoothing circuit 23. The other end of the reception coil 21 is connected with the other end of the variable capacity circuit 22 and with the other input terminal of the rectification and smoothing circuit 23.

The reception coil 21 receives electric power from the transmission coil 13 by resonating with the AC current passing through the transmission coil 13 of the power transmission device 2. The reception coil 21 outputs the received electric power to the rectification and smoothing circuit 23 via the variable capacity circuit 22. Note that the number of turns in the winding of the reception coil 21 and the number of turns in the winding of the transmission coil 13 of the power transmission device 2 may be identical or different. Further, the ranges of values that the inductance of the reception coil 21 of the resonance circuit 20 and the capacitance of the variable capacity circuit 22 can take may be set to satisfy that the resonance frequency (second resonance frequency) $f_{r2}$=100 kHz for an expected coupling coefficient (for example, k=0.1 to 0.5).

The variable capacity circuit 22 is a circuit which can adjust the capacitance. One end of the variable capacity circuit 22 is connected with one end of the reception coil 21 and with one input terminal of the rectification and smoothing circuit 23. The other end of the variable capacity circuit 22 is connected with the other end of the reception coil 21 and the other input terminal of the rectification and smoothing circuit 23. In other words, the variable capacity circuit 22 is connected in parallel with the reception coil 21. The variable capacity circuit 22, operating together with the reception coil 21, resonates and outputs the electric power received by the reception coil 21 to the rectification and smoothing circuit 23.

In the present embodiment, the variable capacity circuit 22 includes three capacitors 221 to 223 and three switching elements 224 to 226 respectively connected in parallel with the reception coil 21. The capacitor 221 and the switching element 224 are connected in series. Similarly, the capacitor 222 and the switching element 225 are connected in series, and the capacitor 223 and the switching element 226 are connected in series. Note that the number of the capacitors included in the variable capacity circuit 22 and connected in parallel with the reception coil 21 is not limited to three. The number of the capacitors included in the variable capacity circuit 22 and connected in parallel with the reception coil 21 needs only to be more than one and may be, for example, two, four, or more.

The switching elements 224 to 226 may be, for example, n-channel MOSFETs. The drain terminal of the switching element 224 is connected with one end of the reception coil 21 via the capacitor 221, and the source terminal of the switching element 224 is connected with the other end of the reception coil 21. Similarly, the drain terminal of the switching element 225 is connected with the one end of the reception coil 21 via the capacitor 222, and the source terminal of the switching element 225 is connected with the other end of the reception coil 21. The drain terminal of the switching element 226 is connected with the one end of the reception coil 21 via with the capacitor 223, and the source terminal of the switching element 226 is connected with the other end of the reception coil 21. The gate terminals of the switching elements 22.4 to 226 are connected with the control circuit 26.

The control circuit 26 switches on and off the switching elements 224 to 226. Among the capacitors 221 to 223, the capacitors connected in series with the switching elements that are turned on contribute to the resonance of the resonance circuit 20. In other words, the resonance frequency (second resonance frequency) $f_{r2}$ of the resonance circuit 20 can be expressed by the equations below.

[Equation 1]

$$f_{r2} = \frac{1}{2\pi\sqrt{C_{pv} \cdot L_{r2}}} \quad (1)$$

$$L_{r2} = L_2(1-k)(1+k)$$

$$C_{pv} = \sum_{i=1}^{3}(s_i \cdot C_i)$$

$$s_i = \begin{cases} 1 & \text{ON} \\ 0 & \text{OFF} \end{cases}$$

Wherein, $C_{pv}$ is the capacitance of the variable capacity circuit 22. $C_i$ (i=1, 2, 3) is the capacitances of the capacitors 221 to 223. Further, $s_i$ (i=1, 2, 3) is a coefficient for indicating whether the switching elements 224 to 226 are turned on or off. When the switching element 224 is turned on, $s_1$=1, and when the switching element 224 is turned off, $s_1$=0. Similarly, when the switching element 225 is turned on, $s_2$=1, and when the switching element 225 is turned off, $s_2$=0. Further, when the switching element 226 is turned on, $s_3$=1, and when the switching element 226 is turned off, $s_3$=0. In other words, $C_{pv}$ is the sum of the capacitances of the capacitors, among the capacitors 221 to 223, connected with the switching elements that are turned on. Note that the capacitances of the capacitors 221 to 223 may be identical or different from each other. $L_2$ is the inductance of the reception coil 21. $L_{r2}$ is the inductance of the reception coil 21 when the transmission coil 13 is short-circuited, and k is a coupling coefficient of the transmission coil 13 and the reception coil 21.

As is apparent from the equation (1), as the number of the capacitors, among the capacitors 221 to 223, contributing to the resonance of the resonance circuit 20 increases or, in other words, the number of the switching elements that are turned on increases, the capacitance of the variable capacity circuit 22 increases and the resonance frequency $f_{r2}$ of the resonance circuit 20 decreases. Conversely, as the number of the capacitors, among the capacitors 221 to 223, not contributing to the resonance of the resonance circuit 20 increases or, in other words, the number of the switching elements that are turned off increases, the resonance frequency $f_{r2}$ of the resonance circuit 20 increases.

The rectification and smoothing circuit 23 includes a full-wave rectification circuit 231 that includes four diodes connected in a bridge and a smoothing capacitor 232. The rectification and smoothing circuit 23 rectifies and smooths the electric power received by the resonance circuit 20 to convert the electric power into DC power. The rectification and smoothing circuit 23 outputs the DC power to the load circuit 24.

The voltage detection circuit 25 detects the output voltage across both terminals of the full-wave rectification circuit 231. Since the output voltages across both terminals of the full-wave rectification circuit 231 correspond one-to-one to the output voltages of the resonance circuit 20, to detect an output voltage across both terminals of the full-wave rectification circuit 231 is to indirectly detect an output voltage of the resonance circuit 20. The voltage detection circuit 25 may be, for example, any of various known voltage detection circuits that can detect a. DC voltage. Note that, in the present embodiment, the voltage detection circuit 25 needs only to determine whether or not the output voltage exceeds a threshold voltage for switching on and off the switching elements of the variable capacity circuit 22 and therefore may be a circuit capable of such detection.

The control circuit 26 controls the capacitance of the variable capacity circuit 22 of the resonance circuit 20 according to the result of voltage detection by the voltage detection circuit 25.

Figure 4A:
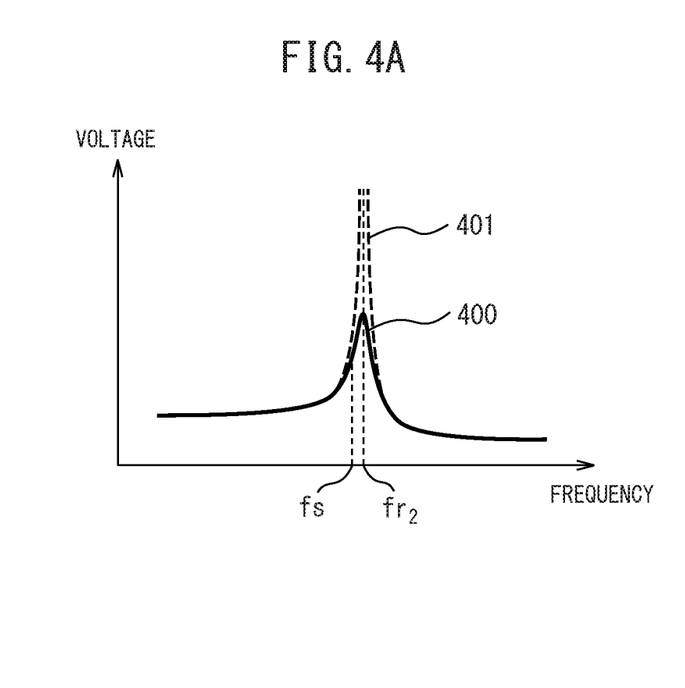
FIG. 4A illustrates an example of frequency characteristics of an output voltage from a resonance circuit by a second resonance method.

FIG. 4A illustrates an example of frequency characteristics of the output voltage of the resonance circuit 20 by the second resonance method. In FIG. 4A, frequency is plotted along the horizontal axis and voltage is plotted along the vertical axis. The graph 400 represents the frequency characteristics of the output voltage in a case in which the resonance frequency of the resonance circuit 20 is $f_{r2}$ and when the load circuit 24 has a certain load resistance. The graph 401 represents the frequency characteristics of the output voltage in a case in which the resonance frequency of the resonance circuit 20 is $f_{r2}$ and when the load resistance of the load circuit 24 has 100 times as great a value as the load resistance relating to the graph 400. As illustrated by the graph 400 and the graph 401, as the switching frequency of the AC power supplied to the transmission coil 13 is closer to the resonance frequency $f_{r2}$ of the resonance circuit 20, the output voltage increases. Further, as the noncontact power supply apparatus according to the second resonance method is driven at a constant current in the vicinity of the resonance frequency $f_{r2}$, the output voltage varies greatly depending on the load resistance of the load circuit 24.

On the other hand, when the switching frequency of the AC power supplied to the transmission coil 13 is distant from the resonance frequency of the resonance circuit $f_{r2}$, the noncontact power supply apparatus is driven at a constant voltage, and the output voltage is approximately constant even when the load resistance of the load circuit 24 changes.

Therefore, for example, when a change in the coupling coefficient brings the resonance frequency $f_{r2}$ of the resonance circuit 20 closer to the switching frequency of the AC power supplied to the transmission coil 13 and the output voltage of the resonance circuit 20 increases, the control circuit 26 can enable the power reception device 3 to continue to be driven at a constant voltage by altering the resonance frequency $f_{r2}$ of the resonance circuit 20 to increase the difference between the switching frequency and the resonance frequency $f_{r2}$.

Figure 4B:
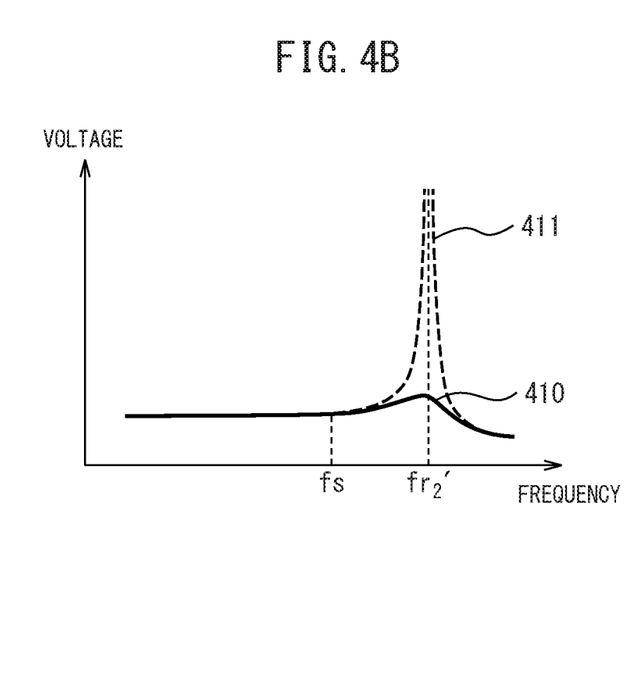
FIG. 4B illustrates an example of frequency characteristics of the output voltage from the resonance circuit in a case in which the resonance frequency of the resonance circuit is altered from $f_{r2}$ to $f_{r2}'$.

FIG. 4B illustrates an example of frequency characteristics of the output voltage in a case in which the resonance frequency of the resonance circuit 20 is altered from $f_{r2}$ to $f_{r2}'$. In FIG. 4B, frequency is plotted along the horizontal axis and voltage is plotted along the vertical axis. The graph 410 represents the frequency characteristics of the output voltage in a case in which the resonance frequency of the resonance circuit 20 is $f_{r2}'$ and the load circuit 24 has a certain load resistance. The graph 411 represents the frequency characteristics of the output voltage in a case in which the resonance frequency of the resonance circuit 20 is $f_{r2}'$ and when the load resistance of the load circuit 24 has 100 times as great a value as the load resistance relating to the graph 410.

For example, as illustrated in FIG. 4A, when the switching frequency fs of the AC power supplied to the transmission coil 13 is close to the resonance frequency $f_{r2}$ of the resonance circuit 20, the output voltage increases. To address this, the increase of the output voltage is detected and the resonance frequency of the resonance circuit 20 is altered from $f_{r2}$ to $f_{r2}'$ as illustrated in FIG. 4B to make the resonance frequency $f_{r2}'$ sufficiently higher than the switching frequency fs, which enables the power reception device 3 to continue to be driven at a constant voltage even when the switching frequency fs of the AC power supplied to the transmission coil 13 is kept constant.

Thus, the control circuit 26 controls the capacitance of the variable capacity circuit 22 in such a way as to decrease the capacitance of the variable capacity circuit 22 when the output voltage of the resonance circuit 20 increases. In the present embodiment, the control circuit 26 increases the number of the switching elements, among the switching elements 224 to 226, that are turned off as the output voltage of the resonance circuit 20 increases. This increases the resonance frequency $f_{r2}$ of the resonance circuit 20 as illustrated in the equation (1) and, as a result, the control circuit 26 can increase the difference between the switching frequency fs of the AC power supplied to the transmission coil 13 and the resonance frequency $f_{r2}$ of the resonance circuit 20 and thereby enable the power reception device 3 to continue to be driven at a constant voltage. This also suppresses an increase of circulating current passing through the resonance circuit 20, suppressing a decline in power transmission efficiency and preventing an excess voltage from being produced in the power reception device 3.

Conversely, when the output voltage of the resonance circuit 20 decreases, the control circuit 26 controls the capacitance of the variable capacity circuit 22 in such a way as to increase the capacitance of the variable capacity circuit 22. In the present embodiment, the control circuit 26 may increase the number of the switching elements, among the switching elements 224 to 226, that are turned on as the output voltage of the resonance circuit 20 decreases.

Note that, when an increase in the output voltage of the resonance circuit 20 is detected, the control circuit 26 may control the capacitance of the variable capacity circuit 22 in such a way as to decrease the resonance frequency of the resonance circuit 20 and make the resonance frequency $f_{r2}$ of the resonance circuit 20 lower than the switching frequency fs of the AC power supplied to the transmission coil 13. The control circuit 26 can also prevent an excess voltage from being produced in the power reception device 3 by controlling the capacitance of the variable capacity circuit 22 in this way. In this case, however, the Q value of the resonance circuit 20 increases and, as a result, the current passing through the resonance circuit 20 also increases.

Further, as the product of the coupling coefficient and the Q value of the reception coil 21 (hereinafter referred to as the kQ-product), which is expressed by the equation (2) below, increases, the phase of the current passing through the transmission coil 13 relatively advances.

[Equation 2]

$$Q = R\sqrt{\frac{C_{pv}}{L_{r2}}} \tag{2}$$

Wherein, R is the resistance of the load circuit 24. When the kQ-product is greater than a prescribed value, the phase of the current passing through the transmission coil 13 advances relative to the phase of the switching voltage, and the power supply circuit 10 and the transmission coil 13 operate under hard switching (capacitive) conditions, resulting in a decline in the energy transmission efficiency. Thus, when an increase in the output voltage of the resonance circuit 20 is detected, it is preferable that the control circuit 26 controls the capacitance of the variable capacity circuit 22 in such a way as to decrease, rather than increase, the capacitance of the variable capacity circuit 22.

Figure 5:
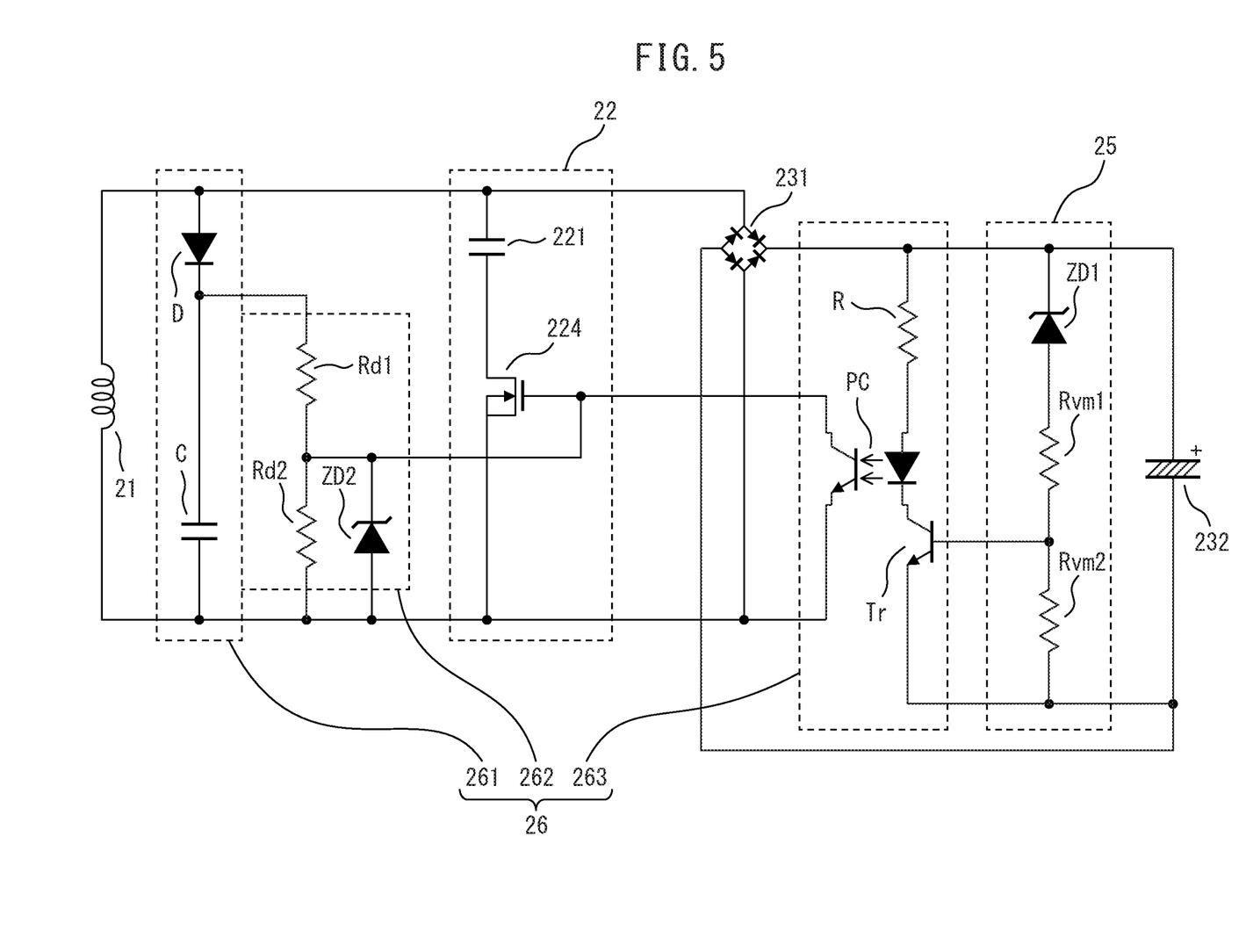
FIG. 5 illustrates an example of a voltage detection circuit and a control circuit of a power reception device.

FIG. 5 illustrates an example of the voltage detection circuit 25 and the control circuit 26 of the power reception device 3. As illustrated in FIG. 5, the control circuit 26 includes a rectification circuit 261, a voltage-dividing circuit 262, and a switching circuit 263. Note that, in FIG. 5, the voltage detection circuit 25 and the switching circuit 263 of the control circuit 26 are illustrated as circuits for switching on and off one of the plurality of switching elements (switching element 224) included in the variable capacity circuit 22 for the sake of simplified description. The voltage detection circuit 25 and the switching circuit 263 of the control circuit 26 may include circuits illustrated in FIG. 5 for each switching element of the variable capacity circuit 22.

In this example, the voltage detection circuit 25 includes a Zener diode ZD1 and two resistors Rvnm1 and Rvm2 that are connected in series between the output terminal on the positive electrode side and the output terminal on the negative electrode side of the full-wave rectification circuit

231. The cathode terminal of the Zener diode ZD1 is connected with the output terminal on the positive electrode side of the full-wave rectification circuit 231 and the anode terminal of the Zener diode ZD1 is connected with the output terminal on the negative electrode side of the full-wave rectification circuit 231 via the two resistors Rvm1 and Rvm2, to be reverse-biased by voltage outputted from the full-wave rectification circuit 231.

Thus, when the voltage outputted from the full-wave rectification circuit 231 is not greater than the breakdown voltage of the Zener diode ZD1, no current passes through the voltage detection circuit 25. On the other hand, when the voltage outputted from the full-wave rectification circuit 231 is greater than the breakdown voltage of the Zener diode ZD1, a current passes through the voltage detection circuit 25. Thus, the voltage detection circuit 25 can detect whether or not the voltage outputted from the full-wave rectification circuit 231 is greater than the breakdown voltage of the Zener diode ZD1. In other words, the breakdown voltage of the Zener diode ZD1 serves as the threshold voltage for switching on and off the corresponding switching element of the variable capacity circuit 22.

Note that it is preferable that the Zener diodes of the voltage detection circuit 25 respectively corresponding to the switching elements of the variable capacity circuit 22 have different breakdown voltages from each other. This allows the voltage detection circuit 25 to use voltages different from each other for respectively switching on and off the switching elements of the variable capacity circuit 22.

The rectification circuit 261 of the control circuit 26 is connected in parallel with the reception coil 21 of the resonance circuit 20 and includes a diode D and a capacitor C. The diode D and the capacitor C are connected in series, with the cathode terminal of the diode D is connected with one end of the capacitor C. The rectification circuit 261 rectifies the AC power received by the reception coil 21 and supplies the rectified DC voltage to the voltage-dividing circuit 262 from a point between the cathode terminal of the diode D and the one end of the capacitor C.

The voltage-dividing circuit 262 includes two resistors Rd1 and Rd2 connected in series between both terminals of the capacitor C of the rectification circuit 261 and a Zener diode ZD2 connected in parallel with the resistor Rd2. The voltage-dividing circuit 262 divides the DC voltage supplied from the rectification circuit 261 between the resistor Rd1 and the resistor Rd2 and supplies the DC voltage obtained by the division to the gate terminal of the switching element 224 from a terminal connected with a point between the resistor Rd1 and the resistor Rd2. Further, the cathode terminal of the Zener diode ZD2 is connected with a terminal connected with a point between the resistor Rd1 and the resistor Rd2 and is connected with the gate terminal of the switching element 224. The anode terminal of the Zener diode ZD2 is connected with the other end of the resistor R2 and with the source terminal of the switching element 224. This allows a voltage corresponding to the breakdown voltage of the Zener diode ZD2 to be applied to the gate terminal of the switching element 224 during the time when the reception coil 21 receives electric power of a certain magnitude or more and, as will be described later, when the switching circuit 263 is turned off. Note that, for each of the other switching elements of the variable capacity circuit 22, DC voltage may be similarly supplied to the gate terminal of the switching element from the terminal connected with a point between the resistor Rd1 and the resistor Rd2.

The switching circuit 263 includes a resistor R, a photo coupler PC, and an npn-type transistor Tr. The resistor R, the light-emitting diode of the photo coupler PC, and the transistor Tr are connected in series in this order from the positive electrode side between the output terminal on the positive electrode side and the output terminal on the negative electrode side of the full-wave rectification circuit 231. In other words, the anode terminal of the light-emitting diode of the photo coupler PC is connected with the output terminal on the positive electrode side of the full-wave rectification circuit 231 via the resistor R, the cathode terminal of the light-emitting diode is connected with the collector terminal of the transistor Tr, and the emitter terminal of the transistor Tr is connected with the output terminal on the negative electrode side of the full-wave rectification circuit 231. The base terminal of the transistor Tr is connected with a point between the resistor Rvm1 and the resistor Rvm2 of the voltage detection circuit 25. On the other hand, one end of the phototransistor of the photo coupler PC is connected with the gate terminal of the switching element 224 of the variable capacity circuit 22 and the other end of the phototransistor is connected with the source terminal of the switching element 224.

When the voltage outputted from the full-wave rectification circuit 231 is not greater than the threshold voltage of the voltage detection circuit 25, i.e., not greater than the breakdown voltage of the Zener diode ZD1, no current passes through the voltage detection circuit 25, no current hence passes through the base terminal of the transistor Tr of the switching circuit 263, and the transistor Tr is turned off. Thus the photo coupler PC is also tuned off. As a result, the switching element 224 is turned on because of the voltage from the voltage-dividing circuit 262 applied to the gate terminal of the switching element 224. Thus the capacitor 221 connected in series with the switching element 224 contributes to the resonance of the resonance circuit 20.

On the other hand, when the voltage outputted from the full-wave rectification circuit 231 exceeds the threshold voltage of the voltage detection circuit 25, a current passes through the voltage detection circuit 25, a current passes through the base terminal of the transistor Tr of the switching circuit 263, and the transistor Tr is turned on. Thus the photo coupler PC is also turned on. As a result, the voltage applied to the gate terminal of the switching element 224 from the voltage-dividing circuit 262 declines and the switching element 224 is turned off. Thus the capacitor 221 connected in series with the switching element 224 does not contribute to the resonance of the resonance circuit 20.

Thus, when the voltage outputted from the full-wave rectification circuit 231 and detected by the voltage detection circuit 25 exceeds the threshold voltage, the control circuit 26 can prevent the capacitor 221 of the variable capacity circuit 22 from contributing to the resonance of the resonance circuit 20 and thereby increase the resonance frequency $f_{r2}$ of the resonance circuit 20. Similarly, the control circuit 26 can prevent any other capacitor of the variable capacity circuit 22 from contributing to the resonance of the resonance circuit 20 when the voltage outputted from the full-wave rectification circuit 231 exceeds the threshold voltage of the capacitor.

As described above, this noncontact power supply apparatus suppresses an increase in the current passing through the transmission coil even when the coupling coefficient declines, by not including a resonance circuit in the power transmission device. Further, this noncontact power supply apparatus monitors the output voltage of the resonance circuit of the power reception device and, when the output voltage increases, alters the capacitance of the variable capacity circuit of the resonance circuit on the power reception side and increases the difference between the resonance frequency of the resonance circuit and the switching frequency of the AC power supplied to the transmission coil of the power transmission device to suppress an increase of the circulating current passing through the resonance circuit and to prevent an excess voltage from being applied to the power reception device. This noncontact power supply apparatus thereby suppresses a decline in energy transmission efficiency even when the coupling coefficient between the transmission coil and the reception coil dynamically changes. Further, this noncontact power supply apparatus prevents a failure of the power reception device by preventing an excess voltage being applied thereto.

Figure 6:
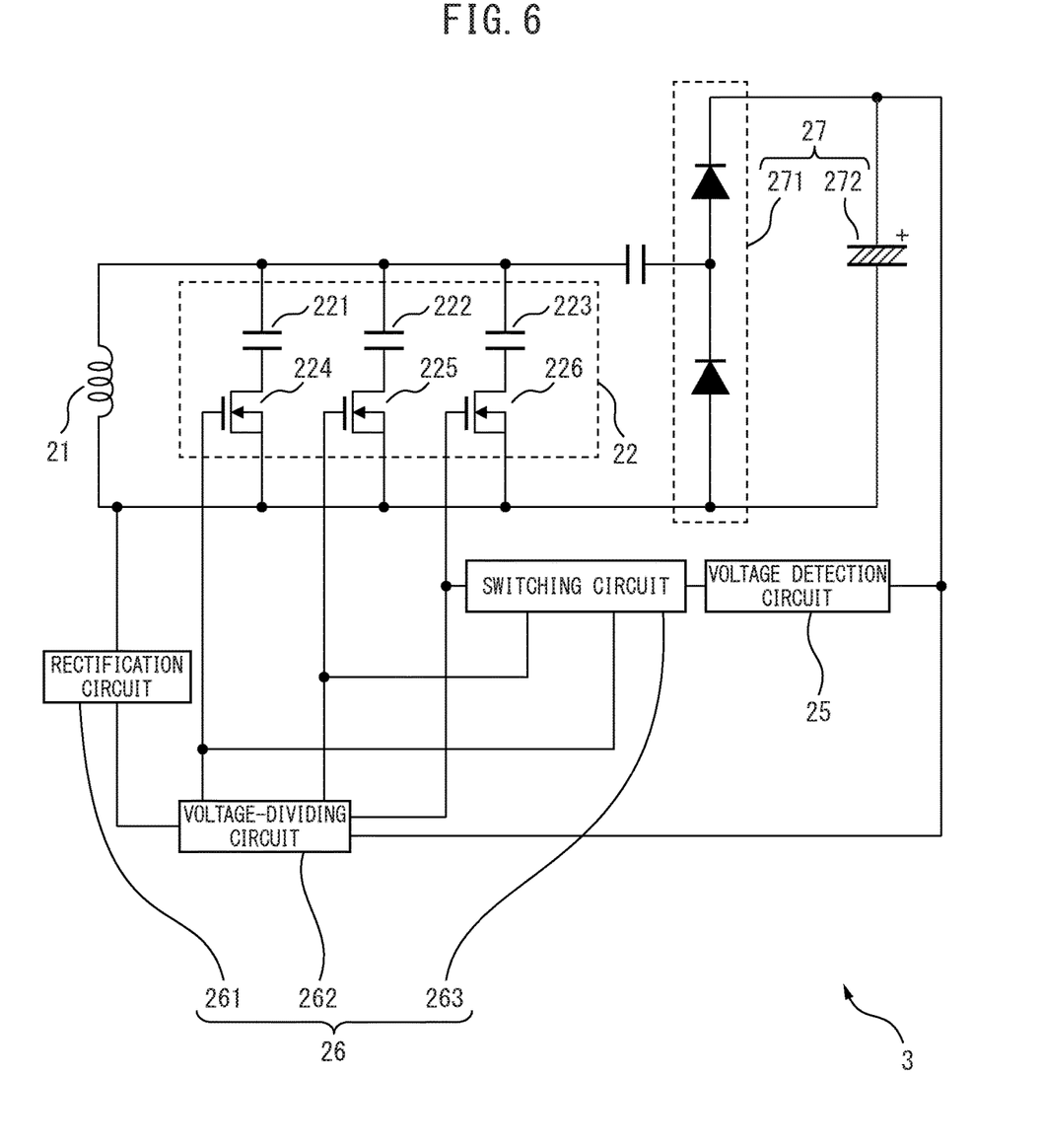
FIG. 6 is a circuit block diagram of the power reception device according to a variation.

Note that, according to a variation, a half-wave rectification circuit may be used in the rectification and smoothing circuit 23 instead of the full-wave rectification circuit 231, and the voltage detection circuit 25 may indirectly detect the output voltage of the resonance circuit 20 by detecting the output voltage from the half-wave rectification circuit.

FIG. 6 is a circuit block diagram of the power reception device 3 according to this variation. In this variation, the power reception device 3 includes a resonance circuit 20 that includes a reception coil 21 and a variable capacity circuit 22, a rectification and smoothing circuit 27, a load circuit 24, a voltage detection circuit 25, and a control circuit 26.

This variation differs from the power reception device according to the above-described embodiment in that the rectification and smoothing circuit 27 includes a half-wave rectification circuit instead of a full-wave rectification circuit and that the switching circuit 263 of the control circuit 26 is configured differently. Therefore, these differences will be described below.

In this variation, the rectification and smoothing circuit 27 includes a half-wave rectification circuit 271 that includes two diodes connected in series and a smoothing capacitor 272 connected in parallel with the half-wave rectification circuit 271. The electric power outputted from the resonance circuit 20 is half-wave rectified by the rectification and smoothing circuit 27.

The voltage detection circuit 25 may be a circuit similar to the voltage detection circuit 25 illustrated in FIG. 5 and detects the voltage between the terminal on the positive side of the smoothing capacitor 272 (i.e., the terminal connected with the cathode terminal of the diode connected in series) of the rectification and smoothing circuit 27 and the ground. When the detected voltage exceeds the threshold voltage, the transistor (not illustrated) of the switching circuit 263 of the control circuit 26 is turned on.

The control circuit 26 includes a rectification circuit and a voltage-dividing circuit similar to the rectification circuit 261 and the voltage-dividing circuit 262 illustrated in FIG. 5. The control circuit 26 applies voltages obtained from the voltage-dividing circuit to the gate terminals of the switching elements 224 to 226 of the variable capacity circuit 22. The control circuit 26 includes a switching circuit similar to the switching circuit 263 illustrated in FIG. 5 except that the photo coupler PC is omitted. In this variation, however, the collector of the transistor is connected with the gate terminal of the corresponding switching element of the variable capacity circuit 22, and the emitter of the transistor is grounded.

In this case also, when the voltage detected by the voltage detection circuit 25 exceeds the threshold voltage, the transistor is turned on and, as a result, the voltage applied to the gate terminal of the corresponding switching element of the variable capacity circuit 22 decreases and the switching element turns off. Thus, the capacitor connected in series with the switching element does not contribute to the resonance of the resonance circuit 20.

In this variation, the circuit configuration is simplified because the reference voltage of the circuits of the power reception device 3 may be set to the common circuit ground.

Further, according to another variation, one of the capacitors included in the variable capacity circuit 22 may be connected in parallel with the reception coil 21 without a switching element interposed. This allows at least one capacitor to be always connected in parallel with the reception coil 21, and thereby the power reception device 3 can always continue to receive electric power by the second resonance method.

According to yet another variation, the configuration of the variable capacity circuit 22 is not limited to the above-described embodiments and the variable capacity circuit 22 may, for example, include a variable capacitor the capacitance of which can be altered mechanically or by other methods. When the variable capacity circuit 22 includes a mechanically variable capacitor, the control circuit 26 may include, for example, a stepping motor for driving the mechanism for adjusting the capacitance of the variable capacitor and a circuit for driving the stepping motor and the like. The control circuit 26 may then control the variable capacity circuit 22 by rotating the stepping motor by the rotation amount corresponding to the voltage detected by the voltage detection circuit 25 so that the capacitance of the variable capacitor may be the capacitance corresponding to the voltage.

Further, in the power transmission device 2, the power supply circuit that supplies AC power to the transmission coil 13 may have a circuit configuration different from the one in the above-described embodiment.

Figure 7A:
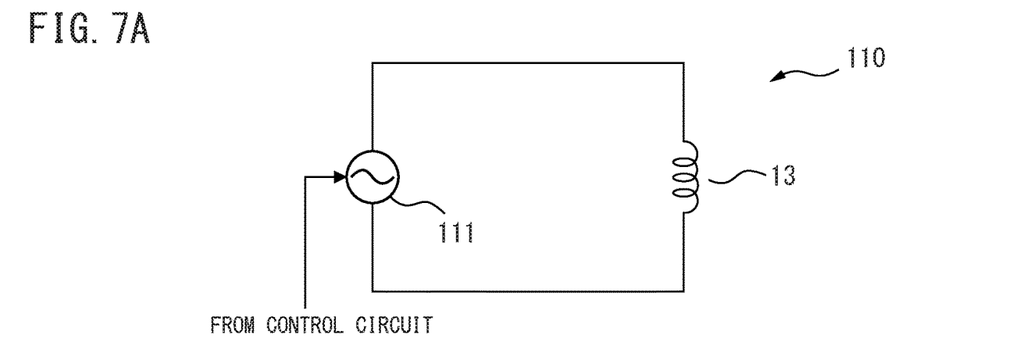
FIG. 7A to FIG. 7C are respectively circuit diagrams of power supply circuits according to variations.
Figure 7B:
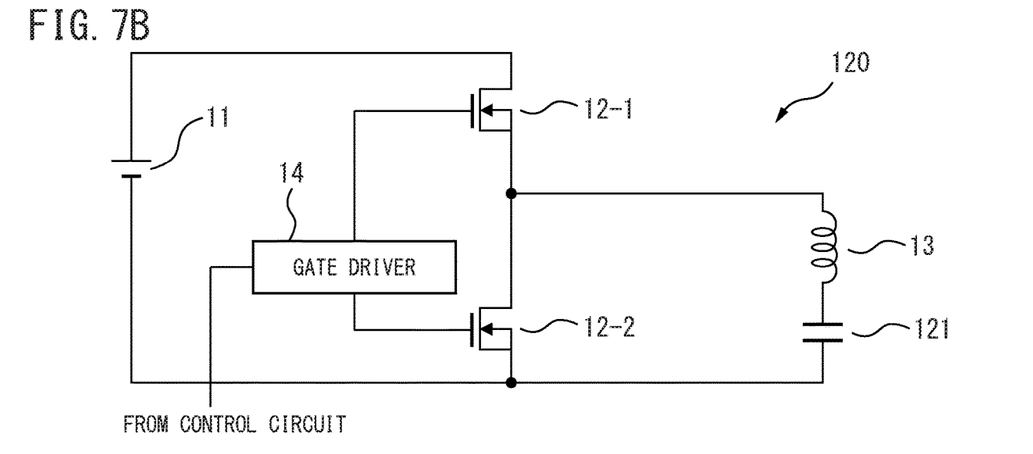
Figure 7C:
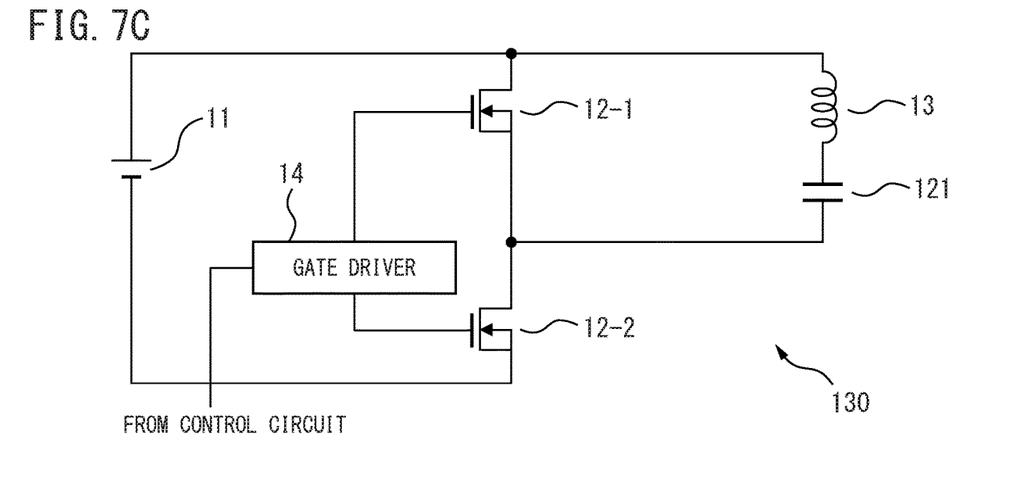

FIG. 7A to FIG. 7C are respectively circuit diagrams of power supply circuits according to variations. The power supply circuit 110 illustrated in FIG. 7A includes an AC power source 111 that supplies AC power having a prescribed frequency. The AC power from the AC power source 111 is directly supplied to the transmission coil 13. Therefore, the control circuit 15 may be omitted in this variation.

The power supply circuit 120 illustrated in FIG. 7B includes a DC power source 11, two switching elements 12-1 and 12-2, and a capacitor 121 for blocking DC current connected in series with a transmission coil 13. Note that the switching elements may be, for example, n-channel MOSFETs also in this variation.

In this variation, the switching element 12-1 and the switching element 12-2 are connected in series between the positive electrode terminal and the negative electrode terminal of the DC power source 11. The switching element 12-1 is connected on the positive electrode side of the DC power source 11, whereas the switching element 12-2 is connected on the negative electrode side of the DC power source 11. The drain terminal of the switching element 12-1 is connected with the positive electrode terminal of the DC power source 11, and the source terminal of the switching element 12-1 is connected with the drain terminal of the switching element 12-2. The source terminal of the switching element 12-2 is connected with the negative electrode terminal of the DC power source 11. Furthermore, the source terminal of the switching element 12-1 and the drain terminal of the switching element 12-2 are connected with one end of the transmission coil 13, and the source terminal of the switching element 12-2 is connected with the other end of the transmission coil 13 via a capacitor 121. The gate terminals of the switching elements are connected with the gate driver 14.

In this variation, the gate driver 14 may alternatingly switch on and off the switching element 12-1 and the switching element 12-2 in accordance with a control signal from the control circuit 15. In other words, when the switching element 12-1 is turned on and the switching element 12-2 is turned off, a current passes from the DC power source 11 through the switching element 12-1 to the transmission coil 13 and the capacitor 121 is charged. On the other hand, when the switching element 12-1 is turned off and the switching element 12-2 is turned on, the capacitor 121 discharges and a current passes from the capacitor 121 through the transmission coil 13 and the switching element 12-2.

The power supply circuit 130 illustrated in FIG. 7C includes a DC power source 11, two switching elements 12-1 and 12-2, and a capacitor 121 connected in series with the transmission coil 13, similarly to the power supply circuit 120. However, in the power supply circuit 130, unlike the power supply circuit 120, one end of the transmission coil 13 is directly connected with the positive electrode terminal of the DC power source 11 and the other end of the transmission coil 13 is connected via the capacitor 121 with the source terminal of the switching element 12-1 and the drain terminal of the switching element 12-2.

In this variation also, the gate driver 14 may switch on and off the switching element 12-1 and the switching element 12-2 alternatingly in accordance with a control signal from the control circuit 15.

Note that, for the power supply circuit 120 illustrated in FIG. 7B and the power supply circuit 130 illustrated in FIG. 7C, the capacitance of the capacitor 121 is preferably set in such a way that the resonance frequency of the transmission coil 13 and the capacitor 121 is smaller than the minimum value of the resonance frequency of the resonance circuit 20 of the power reception device 3 and the switching frequency in order to prevent the transmission coil 13 and the capacitor 121 from operating as a resonance circuit at the switching frequency. This suppresses a decline in power transmission efficiency due to an increase of the current passing through the transmission coil 13.

Further, similarly to the power supply circuit 120 and the power supply circuit 130, a capacitor for blocking DC current connected in series with the transmission coil 13 may be provided also in the above-described embodiment. However, also in this case, the capacitance of the capacitor is preferably set in such a way that the resonance frequency of the transmission coil 13 and the capacitor is smaller than the minimum value of the resonance frequency of the resonance circuit 20 of the power reception device 3 and the switching frequency in order to prevent the transmission coil 13 and the capacitor from operating as a resonance circuit at the switching frequency.

Further, the switching frequency of the AC power supplied to the transmission coil need not be constant and, for example, the current passing through the transmission coil may be measured with an ammeter and the control circuit of the power transmission device may perform control to decrease the switching frequency when the current value exceeds a prescribed threshold value.

As described above, a person skilled in the art can apply various alterations suitable to embodiments without departing from the scope of the present invention.

REFERENCE SIGNS LIST

1 Noncontact power supply apparatus
2 Power transmission device
10, 110, 120, 130 Power supply circuit
11 DC power source
12-1 to 12-4 Switching element
13 Transmission coil
14 Gate driver
15 Control circuit
3 Power reception device
20 Resonance circuit
21 Reception coil
22 Variable capacity circuit
221 to 223 Capacitor
224 to 226 Switching element
23, 27 Rectification and smoothing circuit
231 Full-wave rectification circuit
271 Half-wave rectification circuit
232, 272 Smoothing capacitor
24 Load circuit
25 Voltage detection circuit
26 Control circuit
261 Rectification circuit
262 Voltage-dividing circuit
263 Switching circuit
111 AC power source
121 Capacitor

The invention claimed is:

1. A noncontact power supply apparatus comprising:
a power transmission device and
a power reception device to which electric power is transmitted from the power transmission device without contact,
wherein the power transmission device comprises:
   a transmission coil that supplies electric power to the power reception device; and
   a power supply circuit that supplies AC power to the transmission coil, the AC power having a frequency at which the transmission coil does not resonate, and
wherein the power reception device comprises:
   a resonance circuit that includes a reception coil that receives electric power from the power transmission device and a variable capacity circuit connected in parallel with the reception coil, the resonance circuit resonating at a frequency in accordance with an inductance of the reception coil and a capacitance of the variable capacity circuit;
   a voltage detection circuit that detects an output voltage from the resonance circuit; and
   a control circuit that controls the capacitance of the variable capacity circuit in accordance with the output voltage,
wherein the variable capacity circuit comprises a plurality of capacitors and at least one switching element connected with one of the plurality of capacitors and the plurality of capacitors are respectively connected with the reception coil in parallel,
wherein the control circuit switches on and off the at least one switching element in accordance with the output voltage
wherein the at least one switching element is switched on and off in accordance with a voltage applied to the at least one switching element, and
wherein the control circuit comprises:
a voltage-dividing circuit that produces a first voltage that turns on the at least one switching element, based on the output voltage from the resonance circuit, and
a switching circuit that applies the first voltage produced by the voltage-dividing circuit to the at least one switching element when the output voltage is not greater than a certain threshold voltage and that does not apply the first voltage produced by the voltage-dividing circuit to the at least one switching element when the output voltage exceeds the certain threshold voltage.

2. The noncontact power supply apparatus according to claim 1, wherein the control circuit decreases the capacitance of the variable capacity circuit as the output voltage increases.

* * * * *